Feb. 12, 1935.  W. L. WETTLAUFER  1,990,765
GYRATING SCRUBBER
Filed July 8, 1932  3 Sheets-Sheet 1
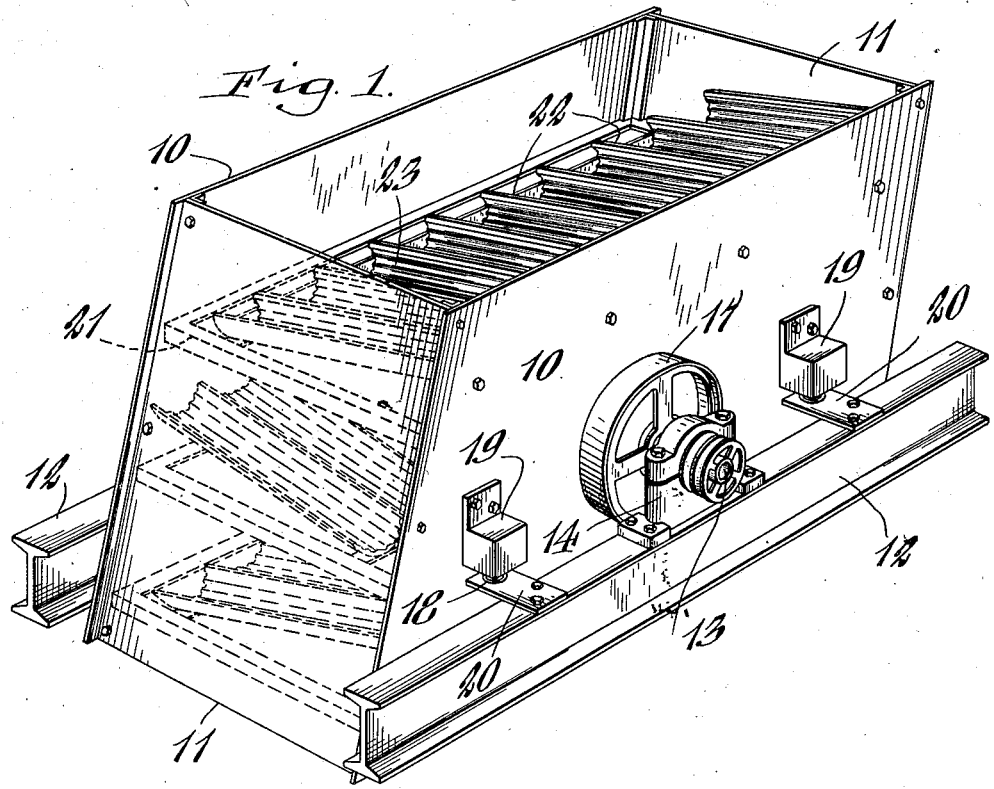
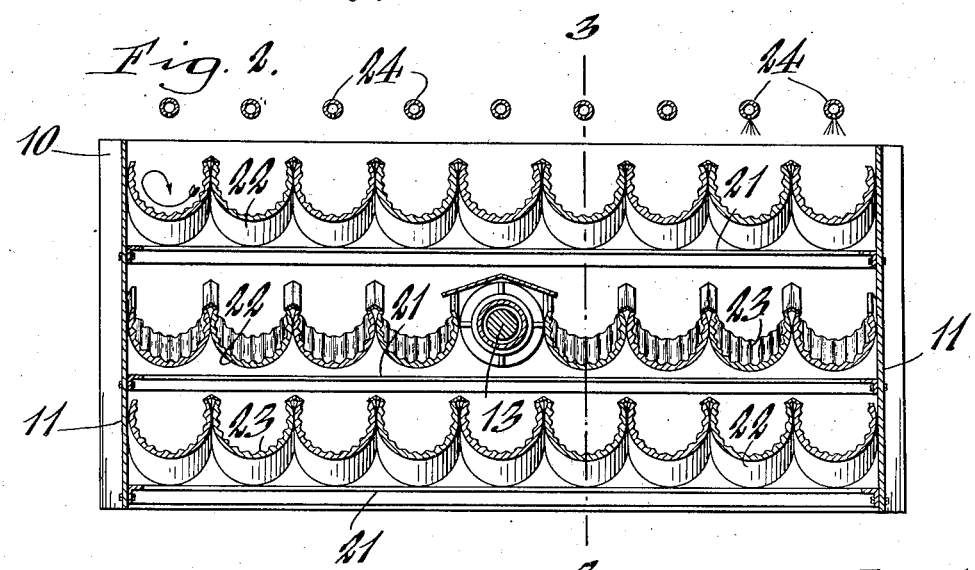

Feb. 12, 1935. W. L. WETTLAUFER 1,990,765
GYRATING SCRUBBER
Filed July 8, 1932 3 Sheets-Sheet 2

Inventor,
William L. Wettlaufer,
by Walter P. Geyer
Attorney

Feb. 12, 1935.  W. L. WETTLAUFER  1,990,765
GYRATING SCRUBBER
Filed July 8, 1932  3 Sheets-Sheet 3
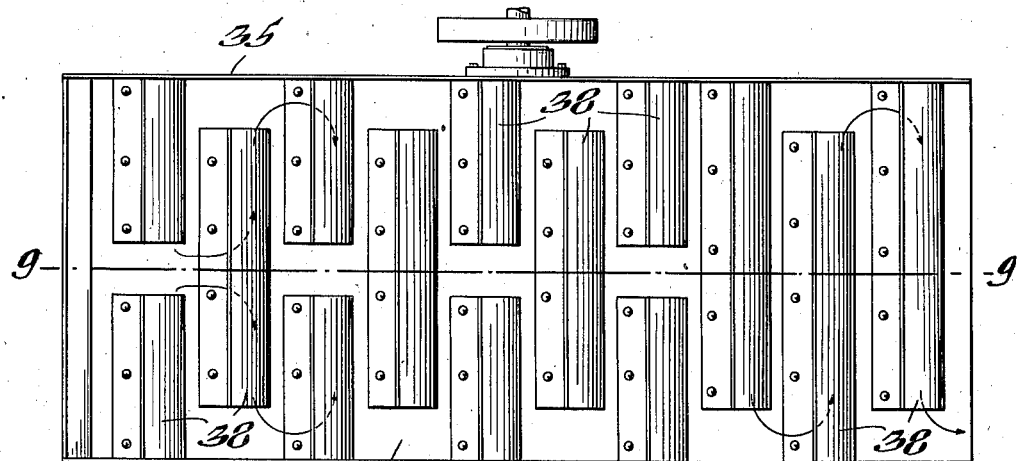
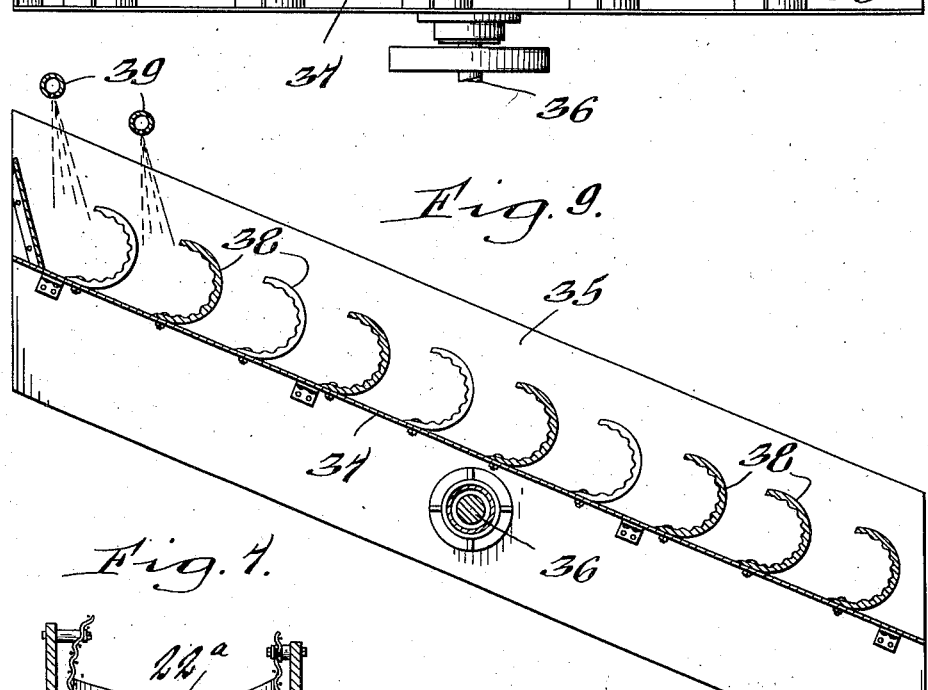
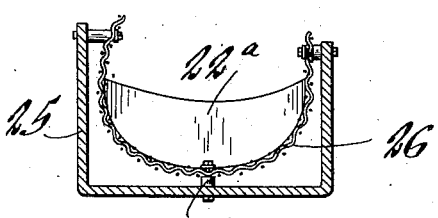

Patented Feb. 12, 1935

1,990,765

UNITED STATES PATENT OFFICE 1,990,765

GYRATING SCRUBBER

William L. Wettlaufer, Buffalo, N. Y., assignor to The W. S. Tyler Company, Cleveland, Ohio, a corporation of Ohio Application July 8, 1932, Serial No. 621,324

10 Claims. (Cl. 259—72)

This invention relates generally to a machine for the treatment of sand, gravel, stone and like materials, and particularly to a machine for washing or scrubbing such materials.

One of its objects is to provide an efficient gyrating scrubber for this purpose which will positively agitate and set the material in motion to effectually expose all sides of the material to break up and remove the foreign matter and to obtain a thorough washing and scrubbing action.

Another object of the invention is the provision of a machine of this character which is simple and inexpensive in construction, which is reliable in operation, requiring a minimum expenditure of power to operate, and which is so designed as to be adapted for treating materials of different sizes without liability of breakage of the material.

Other features of the invention reside in the construction and arrangement of parts hereinafter described and particularly pointed out in the appended claims.

In the accompanying drawings:—

Figure 1 is a perspective view of the gyrating scrubber embodying my invention.

Figure 2 is a longitudinal section thereof.

Figures 6 and 7 are cross sections of a scrubbing deck trough showing a slightly modified form of the invention.

Figure 8 is a top plan view of another modification of the invention.

Figure 9 is a longitudinal section thereof taken on line 9—9, Figure 8.

Similar characters of reference indicate corresponding parts throughout the several views.

Figure 4:
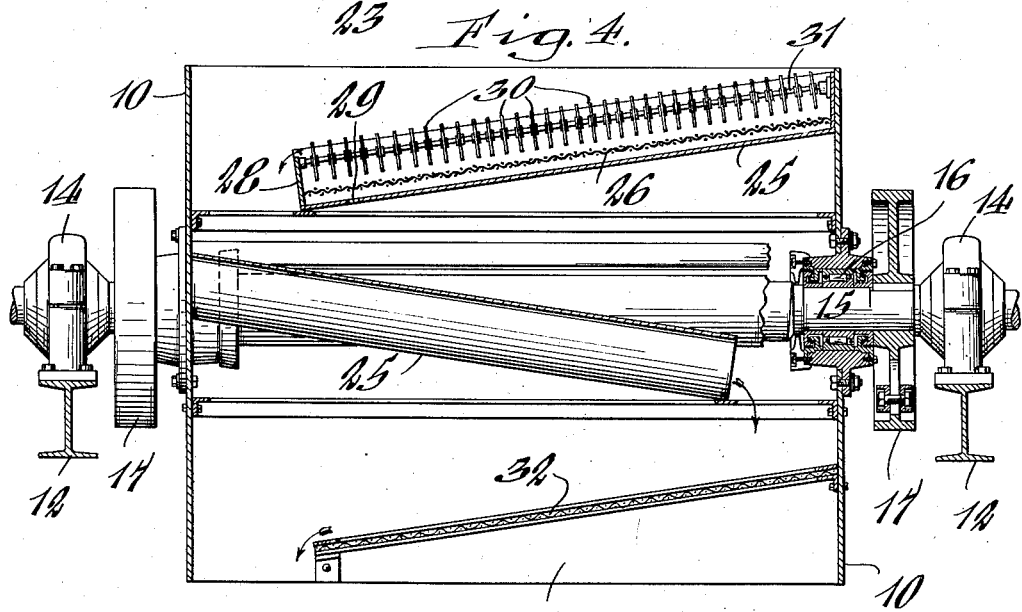
Figure 4 is a cross section similar to Fig. 3 showing a modified arrangement of scrubbing decks.

In connection with the invention a vibratory or shaking body or carrier is provided which may be of any suitable construction, that shown in the drawings, by way of example, being of a type to gyrate in a vertical plane and consisting of side plates 10, 10 and end plates 11, 11 to provide a substantially rectangular box-like structure. This gyrating body is preferably disposed in a substantially horizontal position on suitable beams 12 and is balanced or supported for rotating vibratory movement midway of its ends on a rotary transverse shaft 13 passing through the side walls 10 of the body substantially at its center of gravity and journaled in suitable bearings 14 attached to said beams. This shaft constitutes the drive element of the machine and imparts to the live frame or body 10, 11, a positive, circular or gyrating movement, whereby all points of such body are vibrated in a circular path or orbit and to this end the shaft has eccentric portions 15 as seen in Figure 4, on which said body is supported, the latter having roller or like bearings 16 attached to its side walls and in which the eccentric portions of the shaft are journaled. For the purpose of maintaining the machine in proper balance, the shaft 13 is provided with counter-balanced wheels 17. To steady and hold the gyrating body in its proper balanced position on the shaft 13, its end portions are yieldingly suspended or supported by any suitable means, for example, coil springs 18 arranged in housings 19 secured to the side plates 10, 10 and seated at their lower ends on supporting members 20 secured to the beams 12.

By mounting the gyrating body in this manner, it can be driven at high speeds and is positively gyrated in circular paths lying at right angles to the drive shaft 13, producing a vigorous vibrating action of the gyrating body in a quiet and uniform manner without escaping vibrations.

The material to be scrubbed or cleaned is delivered to this gyrating body 10, 11 by any suitable feed arrangement not shown, means being arranged within the body to receive the material and to impart thereto a vigorous gyrating, circular or tumbling-like motion to effect the removal of any foreign matter from the stone, gravel or like material, so that when it is discharged from the machine it is perfectly clean. The means for receiving the material and imparting thereto the agitating action preferably consists of one or more decks indicated generally by the numeral 21, each including a series of trough-like portions 22 arranged side by side substantially from the front end to the rear end of the machine and extending transversely of the body substantially parallel to the axis of the shaft 13. The trough-like portions of the scrubbing deck are preferably approximately semi-circular in cross section and are preferably roughened on their interior surface for the purpose of creating frictional contact between the material and the trough walls so as to impart to the material a tumbling-like action in response to the gyrating motion of the machine body, the particles of material taking a loop or circular-like path, as indicated by the arrow in Figure 2. By way of example, I have shown the interior surfaces of the trough-like portions provided with corrugations 23 running lengthwise of the troughs, although it is to be understood that any other appropriate medium may be employed to produce the tumbling-like action to the material.

Figure 3:
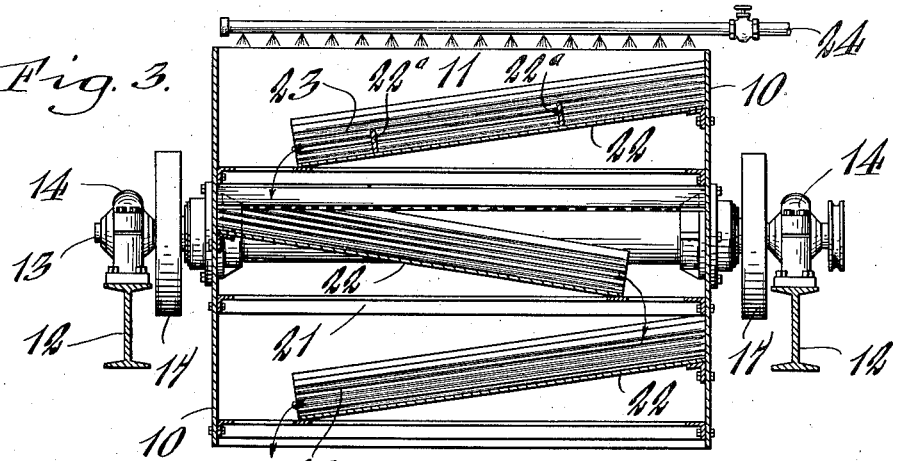
Figure 3 is a cross section taken on line 3—3, Figure 2.

In Figures 1–3, inclusive, I have shown three scrubbing decks disposed in superposed relation, the decks being alternately inclined in opposite directions transversely of the gyratory body with the end of each deck terminating short of the opposing side plate of the machine-body to form a discharge passage for the stone or like material, whereby the material travels in a more or less sinuous course transversely of the machine while being agitated and tumbled in a spiral-like course in planes at approximately right angles to the shaft. During this action of the material, the particles not only rub against the trough walls but also against one another to effect the loosening and removal of clay and other foreign matter from the material.

Disposed over the scrubbing machine are a plurality of pipes 24 for spraying water onto the scrubbing decks, the water assisting in removing the foreign matter from the material.

Figure 5:
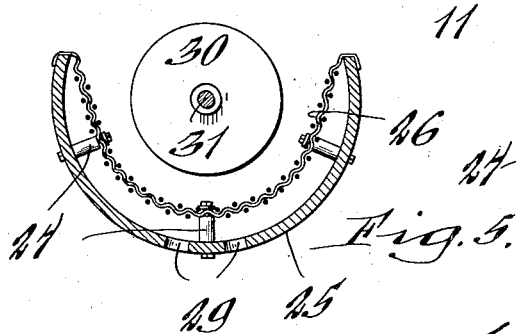
Figure 5 is a cross section through one of the scrubbing deck troughs of Figure 4.

In the modified form of the invention shown in Figures 4 and 5, two superposed and oppositely-sloping scrubbing decks are shown, each consisting of one or more trough-like sections extending transversely of the gyratory body and including an outer section or shell 25 of sheet metal or like material and an inner section 26 spaced from the outer section and constructed of wire mesh, the inner section being supported in spaced relation by suitable spacing ties 27. By this construction, a combined screening and scrubbing action is accomplished within the trough-sections, the foreign, removed material dropping through the screen section 26 into the outer shell 25, and being washed away by the water which is used during the cleaning and scrubbing operations. At the discharge end of each trough-like section or at any point intermediate its ends there may be arranged one or more baffle plates or bridge walls 28 which projects somewhat above the bottom side of the screen 26 and thereby retard the transverse flow of the material through the trough, the material eventually passing over the top edge of the baffle and discharged onto the next scrubbing deck below. In its bottom side the outer shell 25 may have one or more openings 29 for the discharge of fluid therefrom, or such fluid may overflow the baffle wall 28, if desired.

For the purpose of assisting in breaking up or dislodging any foreign matter from the material being scrubbed, I preferably provide means within each trough for intercepting the material-particles. As shown in Figures 4 and 5, this means may consist of a series of disk-like elements 30 disposed lengthwise of the trough in spaced relation to its inner wall and mounted on a shaft or support 31 suitably supported at its ends in the trough. By this arrangement, the particles of material come in contact with the edges of the disks during the agitation thereof afforded by the vibratory body and by so doing, the clay and other foreign matter is loosened from the material. These disks also act as baffles in retarding the flow of material through the troughs, whereby the particles are thoroughly agitated and washed to remove the foreign matter therefrom. If desired, a screen deck 32 may be provided below the lowermost scrubbing deck for the purpose of separating the minus from the product being scrubbed and cleaned, as well as for rinsing and dewatering purposes. This screen may be inclined transversely or lengthwise of the gyrating body, and when transversely inclined, as seen in Figure 4, its discharge end terminates short of the adjoining body-wall 10 to permit the passage of the scrubbed material from the machine to a suitable receptacle or conveyor for receiving it.

Figure 6:
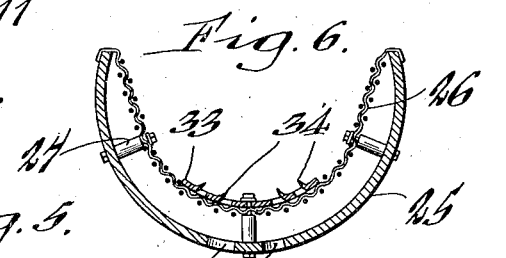

In the modification shown in Figure 6, the means for intercepting the material in the trough-sections to assist in removing the foreign matter therefrom is in the form of a plate 33 fitted in the bottom of the trough and having teeth 34 rising therefrom and against which the material, while in motion, is adapt to impinge.

Referring now to the modified form of the invention depicted in Figures 8 and 9 of the drawings, 35 indicates a vibratory body, which may be mounted on a shaft 36 in substantially the same manner as that shown in Figure 1, or otherwise supported for vibratory movement, and which has a panel or deck 37 mounted thereon which may be made of solid plate or screening. Applied to the top side of the panel are a plurality of material-receiving elements or troughs 38 which are disposed transversely, or if desired, somewhat diagonally of the vibratory body and through which the material to be washed or scrubbed travels in a substantially crosswise course from the feed end to the discharge end of the machine. As seen in Figure 9, the vibratory body 35 is inclined somewhat, the material being fed at the upper or rear end in any appropriate manner and discharged at the lower or front end thereof. These troughs are disposed with their bottoms facing forwardly or toward the discharge end of the vibratory body while their open sides face upwardly or toward its feed end, whereby the material is simultaneously directed or guided lengthwise of the troughs as well as agitated transversely thereof. During the vibration of the trough-carrying body, the material is thoroughly agitated and tumbled in the manner heretofore described to effect the removal of foreign matter therefrom, water being sprayed from overhead pipes 39 on to the material to wash it.

In order to effect the passage of the material from one trough to another, the troughs 38 may be arranged in the manner shown at the feed end of the machine, wherein the uppermost trough is divided substantially centrally thereof to discharge the material into the next lower trough which terminates at its ends short of the side walls of the vibratory body to form passages for the discharge of the material into the next lower trough and so on. If desired, however, the troughs may be arranged in the manner shown at the discharge end of the machine, wherein they are in staggered relation, one trough terminating short of one side wall of the body, and the adjoining one terminating short of the opposite wall, whereby the material travels in a sinuous course across the machine during its agitation in a spiral or loop-like fashion resulting from the vibration imparted to the troughs by the vibratory body.

While the troughs, in which the material is agitated and scrubbed to produce a clean product free from clay and other foreign mater, have been shown as of one size, it is to be understood that they may be made in varying sizes to accommodate different materials. Further, while a series of troughs has been shown for the purpose of obtaining capacity production, a less number may be used when desired.

Mention has been heretofore made of baffle or bridge walls arranged within the troughs to retard the flow of material therethrough during the washing and scrubbing action, one of such walls being indicated at 28 in Figure 4. In the upper trough 22 of Figure 3, the bridge walls are shown at 22a disposed intermediate the ends of the trough, and in the modified shape of the trough shown in Figure 7, a similar bridge wall is indicated at 22a.

I claim as my invention:—

1. A machine of the character described, comprising a gyrating body, and a plurality of intercommunicating superposed receiving decks for the material to be treated disposed transversely of and each inclined in a direction transversely of said body and opposite to that of an adjoining deck.

2. A machine of the character described, comprising a gyrating body, and a plurality of superposed receiving decks for the material to be treated disposed transversely of said body and each inclined in a direction transversely thereof and opposite to that of an adjoining deck, said decks terminating at their alternate transverse edges short of the opposing side wall of the gyrating body for establishing communication between decks.

3. A machine of the character described, comprising a gyrating body, means for gyrating said body in substantially circular paths lying in planes at right angles to the axis of the gyrating means, and a substantially trough-shaped material receiving element mounted on said body in sloping relation to the gyrating axis, the contacting walls of said receiving element being roughened to transmit the gyrating action of said body to the material.

4. A machine of the character described, comprising a gyrating body, means for gyrating said body in substantially circular paths lying in planes at right angles to the axis of the gyrating means, and a substantially trough-shaped material receiving element mounted on said body in sloping relation to the gyrating axis and terminating at one end short of the adjoining side wall of the body to form a discharge passage, the interior wall of said receiving element having longitudinal corrugations thereon for creating a frictional contact between the same and the material to transmit gyratory motion to the material in substantially vertical planes lengthwise of the body.

5. In a machine of the character described, the combination of a support, a gyrating body, a transverse shaft mounted on said support and extending through said body at substantially its center of gravity, means on said shaft for positively gyrating said body in circular paths lying at right angles to the shaft, yieldable supports for said body disposed at opposite sides of said shaft, and a plurality of superposed, trough-shaped material receiving elements mounted on the gyrating body with the axes of their troughs in substantially parallel relation to the shaft-axis, said elements sloping alternately in opposite directions transversely of the gyrating body and terminating at alternate opposite ends short of the adjoining side wall of said body to form a discharge passage, whereby the material is agitated transversely of their troughs and in planes at right angles to said shaft and caused to simultaneously flow in a direction parallel to the troughs and transversely of said gyrating body.

6. A machine of the character described, comprising a gyrating body, and a substantially trough-shaped receiving deck for the material to be treated mounted on said body in substantially parallel relation to its gyrating axis, said deck including an inner, foraminous, material-contacting element and an outer fluid receiving shell disposed about and in spaced relation to said inner element.

7. A machine of the character described, comprising a gyrating body, a substantially trough-shaped receiving deck for the material to be treated mounted on said body in substantially parallel relation to its gyrating axis, and means in said receiving deck for intercepting the material flowing therethrough, said means including a plurality of elements disposed in longitudinally spaced relation and having edges disposed transversely of the deck.

8. A machine of the character described, comprising a gyrating body, a substantially trough-shaped receiving deck for the material to be treated mounted on said body in fixed relation thereto and in substantially parallel relation to its gyrating axis, and a support disposed lengthwise of the deck and having a plurality of longitudinally-spaced disks thereon spaced from the interior wall of the deck.

9. A machine of the character described, comprising a gyrating body, and a substantially trough-shaped receiving deck for the material to be treated mounted on said body in substantially parallel relation to its gyrating axis, said deck being inclined from one side of said body to the other to effect a flow of the material in the direction of the gyrating axis, one end of said deck terminating short of the side of the body to form a discharge passage and having a baffling wall rising from its bottom to retard the flow of material over the deck.

10. A machine of the character described, comprising a substantially trough-shaped element of foraminous construction for receiving material to be treated, and means for gyrating said element to agitate the material transversely of the element in planes at right angles to the trough thereof, the trough-shaped element extending generally in the direction of the axis of said gyrating means and the contacting walls of said element being roughened to transmit the gyrating action to the material.

WILLIAM L. WETTLAUFER.